July 28, 1936.   A. ECKERT   2,049,158
VALVE FOR STEAM COOKERS
Filed Jan. 2, 1935
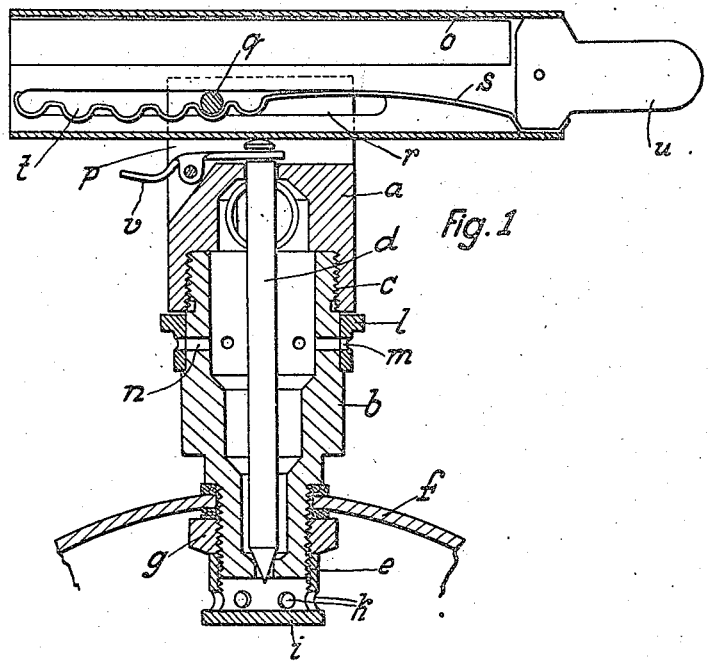
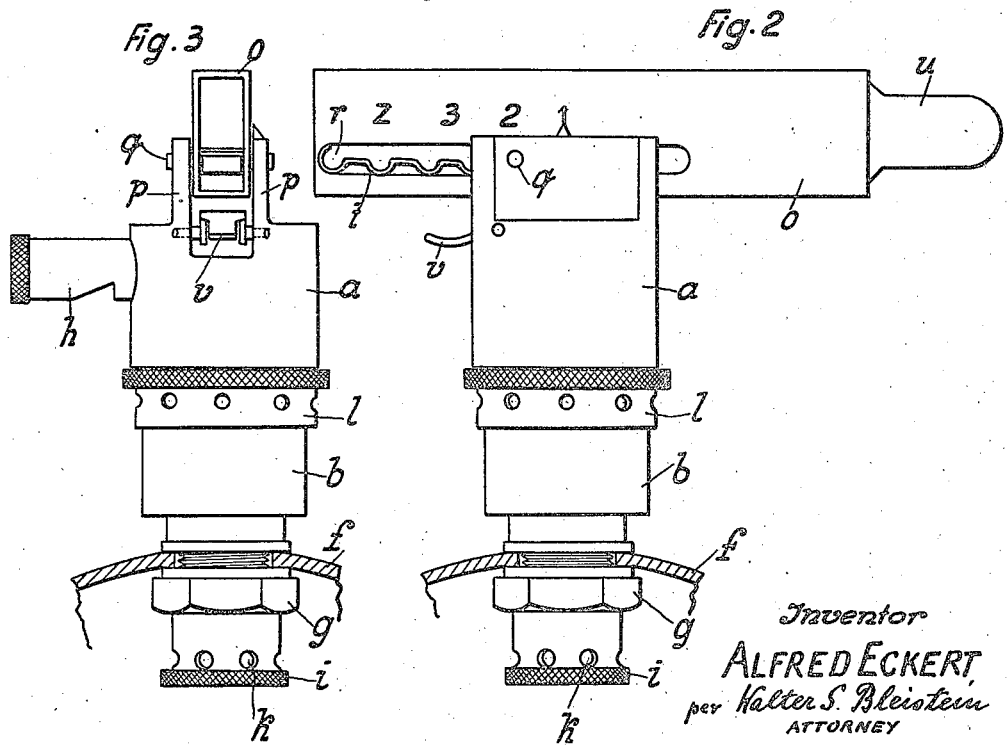
Inventor
ALFRED ECKERT
per Walter S. Bleistein
ATTORNEY Patented July 28, 1936

2,049,158

UNITED STATES PATENT OFFICE 2,049,158

VALVE FOR STEAM COOKERS

Alfred Eckert, Berlin, Germany, assignor to Gesellschaft für Wirtschaftsbedarf, m. b. H., Berlin, Germany Application January 2, 1935, Serial No. 85
In Germany January 16, 1934

4 Claims. (Cl. 277—64)

A control valve for cooking utensils using steam under pressure is known which consists of a valve casing secured to the cooking utensil or to its lid, and a needle or piston valve which at the one end controls an opening into the cooking utensil and at the other end engages under a weight so mounted as to be capable of swinging and sliding on the valve casing, the said weight controlling a signal whistle while being adjustably held in whatever position it may be in by a spring which engages with the pivotal centre pin of the weight. The pivotal centre pin of the weight is advantageously so disposed that when the weight is moved into one end position it rocks about the centre pin and in doing so strikes for example against a lever connected to the valve spindle and releases the latter, so that the spindle rises, in order that when the pressure in the cooking utensil falls considerably below that of the atmosphere air can enter the cooking utensil and so allow the lid to be lifted off.

The present invention relates to a modified form of such a control valve and consists in providing on the valve body an adjustable member by means of which to cover and uncover the openings in the valve body.

This modification of the control valve affords the following great advantages:

The control valve can be converted into an ordinary steam valve when there is a danger of the signalling whistle not being heard—when, for example, it should become necessary to leave for a short while the room in which the cooking is being done. In this case all that is necessary is to set the adjustable member (which for example may be formed as a rotating closure member) for the whole time of absence, in such a way that the openings in the valve body are uncovered in which case the valve will function as a steam valve. On the return to the room where the cooking is being done the rotating closure member is reset so that the openings in the valve body are covered, and thus the valve can again act as a quick-operating valve for cooking utensils.

A further advantage is that the combination valve according to the invention converts the cooking utensil to a universal cooker in that it permits it to be utilized as a quick-acting cooking utensil, when it is desired to cook heavy, solid foods, and by using it also as a casserole for the cooking, for example, of tender vegetables, for stewing fruit and vegetables and so on.

The accompanying drawing illustrates by way of example one construction of the valve according to the invention.

Figure 1 is a section, on an enlarged scale, of the valve fitted on a lid.

Figure 2 is a side elevation, and

Figure 3 is a front elevation.

Referring to the drawing the valve according to the invention consists of a casing $a$, $b$ in two parts connected together by a screw thread $c$. The part $b$ is formed at its perforated bottom part as a seat for the valve needle $d$, and it is screw-threaded at its lower extremity at $e$ for convenient insertion into the lid $f$ and to enable it to be secured to the lid in the usual manner by means of a nut $g$.

The part $a$ is centrally bored to allow the passage and protrusion of the valve needle $d$. The centrally bored part $a$ is furthermore provided with a lateral opening to accommodate the whistle $h$.

A cover $i$ screwed to the part $b$ is provided with holes $k$ to enable the steam to pass from the cooking utensil into the cover $i$.

Above the part $a$ there is provided a rotatable ring $l$ having any desired number of holes $m$, which can be brought into coincidence with holes $n$ in the part $b$ of the casing. When the holes in the two parts coincide, the steam escapes from inside the valve through the holes $m$, $n$, in which case the valve acts as an ordinary steam valve. In the other case—that is to say, when the rotatable ring $l$ obturates the holes $n$—the valve acts as a quick-acting valve for cooking utensils.

The weight $o$ is mounted to rotate and slide on a pin $q$, which is secured to guide extensions $p$ on the part $a$ and extends through a slot $r$ in the weight $o$. The width of the slot $r$ is equal to the diameter of the pin $q$.

In order to make it possible on the one hand for the weight to be easily moved and on the other hand for it to be held positively in the set position, locking depressions or notches are provided in a spring disposed above and below the pin $q$, for example, a leaf spring $s$ secured at one end and provided with resilient depressions or notches $t$ into any one of which the pin $q$ can drop. The depressions or notches $t$ in the spring $s$ are spaced apart to correspond to the adjustments to be made in accordance with cooking practice.

The weight $o$ may, for example, be in the form of a sleeve having an insulated handle $u$ at one end and the spring may then be clamped or otherwise secured, for example with one end between the handle and the sleeve.

If the pressure in the cooking utensil is so much below atmospheric that the lid cannot be lifted, the weight o is moved as far as possible over to the left over the rotating pin q, and swung upwardly. The weight o then strikes against the free arm of a two-armed lever v mounted in the part a of the casing, imparting to the lever v a rotary movement and in this way lifting the valve needle from its seat so that air can pass through the holes m, n, into the cooking utensil.

I claim:

1. A regulating and safety device for steam cooking utensils comprising a valve casing having a first aperture for admitting steam from a given utensil to said casing, a second aperture, and at least one third aperture towards the open air, a valve member adapted to close said first aperture, externally controllable means for adjustably loading said valve member, means for removing said valve member from said first aperture, arranged in cooperation with said externally controllable means to hold said valve removed from said first aperture, a signalling device in communication with said casing through said second aperture, and adjustable means on said casing for selectively closing and opening said third aperture to thereby divert the steam either wholly or partly from said signalling device.

2. A regulating and safety device for steam cooking utensils comprising a valve casing having a first aperture for admitting steam from a given utensil to said casing, a second aperture, and third apertures towards the open air, a valve member adapted to close said first aperture and to permit steam to reach said second and said third apertures when removed from said first aperture, externally controllable means for adjustably loading said valve member, means for removing said valve member from said first aperture, a signalling device in communication with said casing through said second aperture, and a sleeve with apertures in its wall corresponding with said third apertures, said sleeve being rotatably mounted on the outside of said casing to selectively control said third apertures and to thereby divert the steam either wholly or partly from said signalling device.

3. A regulating and safety device for steam cooking utensils comprising a valve casing having a first aperture for admitting steam from a given utensil to said casing, a second aperture and third apertures towards the open air, a valve member adapted to close said first aperture, and to permit steam to reach said second and said third apertures when removed from said first aperture, a signalling device in communication with said casing through said second aperture, a pivotally mounted two-armed weighted lever, means for adjustably altering the position of said lever in relation to its pivot and to resiliently hold it in its adjusted position, means for removing said valve member from said first aperture, one arm of said weighted lever being adapted to load said valve member in various positions of said weighted lever in order to keep said valve member closing said first aperture against a steam pressure below a desired limit, and adjustable means on the outside of said casing for closing and opening said third apertures to selectively control them and to thereby divert the steam either wholly or partly from said signalling device.

4. A regulating and safety valve for a steam cooking utensil comprising a substantially cylindrical casing provided with a first aperture in its bottom for admitting steam from the cooking utensil to said casing, with a second aperture in its side wall, with a peripherical groove on the outer surface of its side wall, and with third apertures in its side wall ending in said groove, a signalling device in communication with said casing through said second aperture, a valve member adapted to close said first aperture, said valve member so arranged and constructed as to permit steam to pass from said first to said second and said third apertures when it is removed from said first aperture, the upper portion of said valve member protruding through the top of said casing, a sleeve with apertures in its wall corresponding with said third apertures, said sleeve being rotatably mounted in said groove of said casing, a first two-armed lever pivotally mounted on the top of said casing, one of the lever arms being adapted to remove said valve from said first aperture, a second pivotally mounted two-armed weighty lever on top of said casing, means for adjustably altering the position of said second lever in relation to its pivot and to resiliently hold it in its adjusted position, one arm of said second lever adapted to bear on the other arm of said first lever for removing said valve member from said first aperture when said second lever is in one of its end positions, and the other arm of said second lever being adapted to bear on the top of said valve member in other positions of said second lever, in order to urge said valve member towards said first aperture.

ALFRED ECKERT.